United States Patent [19]
Newquist

[11] Patent Number: 5,928,752
[45] Date of Patent: *Jul. 27, 1999

[54] QUICK INSTALLATION-REMOVAL THERMAL INSULATION BLANKET FOR SPACE CRAFT

[75] Inventor: Charles W. Newquist, Issaquah, Wash.

[73] Assignee: The Boeing Company, Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,601

[22] Filed: Jun. 30, 1997

[51] Int. Cl.$^6$ .................................. B32B 3/24; B32B 1/06
[52] U.S. Cl. .............................. 428/74; 428/99; 52/404.2; 52/407.4; 52/406.2; 442/13; 442/14; 442/52
[58] Field of Search .................................. 442/13, 14, 52, 442/57; 428/99, 74; 52/404.2, 407.4, 406.1, 406.2; 244/117 A

[56] References Cited

U.S. PATENT DOCUMENTS

| | | |
|---|---|---|
| 2,460,848 | 2/1949 | Rover . |
| 3,343,227 | 9/1967 | Brown et al. . |
| 3,709,733 | 1/1973 | Mautner . |
| 4,084,362 | 4/1978 | Piazza . |

(List continued on next page.)

FOREIGN PATENT DOCUMENTS

| | | |
|---|---|---|
| 617283 | 11/1991 | Australia . |
| 691307 | 5/1940 | Germany . |
| WO 93/21061 | 10/1993 | WIPO . |

OTHER PUBLICATIONS

Sieg Borck, "High–Temperature Thermal Insulation Quilts," U.S. Statutory Invention Registration No. H957, Aug. 6, 1991.

Howard Goldstein, et al., "Insulation Blankets for High–Temperature Use," NTIS Tech Notes, May 1986, No. 5, Springfield, Virginia, p. 536.

K. Keller et al., "High–Temperature Insulations," ESA Bulletin, Nov. 1994, No. 80, Noordwijk, NL, pp. 50–56.

Ronald E. Kolecki and Carroll H. Clatterbuck, "Easy–on, Easy–off Blanket Fastener," NASA Tech Briefs, vol. 16, No. 4, Apr. 1992, Greenbelt, Maryland, p. 90.

James D. Cole and Michael L. Marke, "Fastener for Thermal Insulation Blankets," NASA Tech Briefs, vol. 3, No. 4, Mar. 1979, p. 603.

*Primary Examiner*—Alexander Thomas
*Attorney, Agent, or Firm*—Mary Y. Redman

[57] ABSTRACT

The invention provides a thermal insulation blanket suitable for removable mounting on a structure such as the exterior of a reusable launch vehicle. In one embodiment, the invention include a batting layer with a rigid screen embedded within it. A cover layer is secured over the batting, and a plurality of fasteners are held by the screen in a position where they extend out from the blanket to be mounted on the exterior of the space craft. The blanket can include two layers of batting with the screen disposed therebetween. The structure would have corresponding mating fasteners on its exterior to which those extending out from the blanket cover would be joined for a secure mount. The blanket can be formed of a first and a second batting layer with the screen positioned therebetween. In a preferred embodiment, a cover would be positioned over the batting layers, and the blanket would be quilted to hold the layers and cover in close proximity. In an embodiment suitable for launch vehicle use, the materials used for the batting, cover and quilting thread would be suitable ceramic fiber materials capable of withstanding reentry heating. The screen can be fabricated of titanium, stainless steel, or other material capable of withstanding reentry temperatures. The fasteners could be any of a variety of commercially available fasteners.

11 Claims, 3 Drawing Sheets

U.S. PATENT DOCUMENTS

| | | |
|---|---|---|
| 4,122,644 | 10/1978 | Woodruff . |
| 4,442,585 | 4/1984 | McGehee, Sr. et al. . |
| 4,456,208 | 6/1984 | MacConochie et al. . |
| 4,507,011 | 3/1985 | Brown . |
| 4,520,601 | 6/1985 | Stacey, Jr. . |
| 4,535,017 | 8/1985 | Kuckein et al. . |
| 4,653,246 | 3/1987 | Hepler . |
| 4,690,851 | 9/1987 | Auduc et al. . |
| 4,713,275 | 12/1987 | Riccitiello et al. . |
| 4,767,656 | 8/1988 | Chee et al. . |
| 4,804,571 | 2/1989 | Jouffreau . |
| 4,919,366 | 4/1990 | Cormier . |
| 4,925,134 | 5/1990 | Keller et al. . |
| 4,943,465 | 7/1990 | Bailey et al. . |
| 5,154,373 | 10/1992 | Scott . |
| 5,178,922 | 1/1993 | Ferrier et al. ............ 244/117 A |
| 5,304,408 | 4/1994 | Jarosz et al. . |
| 5,330,124 | 7/1994 | Le Touche . |
| 5,421,133 | 6/1995 | Berdan, II et al. . |
| 5,489,074 | 2/1996 | Arnold et al. . |
| 5,511,747 | 4/1996 | Parrot et al. . |
| 5,759,659 | 6/1998 | Sanocki et al. . |

QUICK INSTALLATION-REMOVAL THERMAL INSULATION BLANKET FOR SPACE CRAFT

BACKGROUND OF THE INVENTION

1. Field of the Invention

This invention relates to the field of thermal insulation blankets, and more particularly to thermal protection for spacecraft.

2. Background Information

Reusable space launch vehicles such as the Space Shuttle need thermal insulation to protect the vehicle from heat during reentry. Currently, flexible quilted ceramic blankets are used to cover a portion of the exterior of such vehicles for heat protection. The flexible blankets usually are on the order of a few feet in length. They are constructed of a ceramic fiber batting surrounded by a ceramic fabric cover material, which is quilted with ceramic thread to form a blanket on the order of an inch or two thick. These are typically mounted on the vehicle exterior by silicon rubber adhesive. Blankets adhered to a structure by adhesive often do not withstand high acoustic loads, on the order of 165 dB, for example. Acoustic loads of this magnitude often cause the quilting threads to break, and the batting to separate and puff up. This reduces the performance of the insulating blanket to unacceptable levels.

The blankets often must be removed and replaced for inspection and repair. The process of installing and removing the blankets is time-consuming and expensive. Turn-around time for reusable launch vehicles will be increasingly critical to their success, and the time involved in removal and replacement of insulation blankets mounted with adhesive will be an obstacle to achieving goals for turn around time for future reusable launch vehicles.

What is needed, then, is a means for quick installation and remove of flexible blankets, which requires very little skill to ensure complete and safe mounting, with minimal room for human error, and in a manner which will allow the blanket to withstand the extreme acoustic loads to which it will be subjected during launch.

SUMMARY OF THE INVENTION

The invention provides a thermal insulation blanket suitable for removable mounting on a structure such as the exterior of a reusable launch vehicle. In one embodiment, the invention includes a batting layer with a rigid screen embedded within it. The embedded screen arrangement can be provided by sandwiching the screen between two layers of batting. A cover layer is secured over the batting, and a plurality of fasteners are held by the screen in a position where they extend out from the blanket to be mounted on structure. The structure would have corresponding mating fasteners on its exterior to which those extending out from the blanket cover would be joined for a secure, removable mount.

The blanket can be formed of a first and a second batting layer with the screen positioned therebetween. In a preferred embodiment, the cover would be positioned over the batting layers, and the blanket would be quilted to hold the layers and cover in close proximity.

In an embodiment suitable for launch vehicle use, the materials used for the batting, cover and quilting thread would be suitable ceramic fiber materials capable of withstanding reentry heating. The screen can be fabricated of titanium, stainless steel, or other material capable of withstanding reentry temperatures. The fasteners could be any of a variety of commercially available fasteners.

BRIEF DESCRIPTION OF THE DRAWINGS(S)

DESCRIPTION OF A PREFERRED EMBODIMENT

Figure 1:
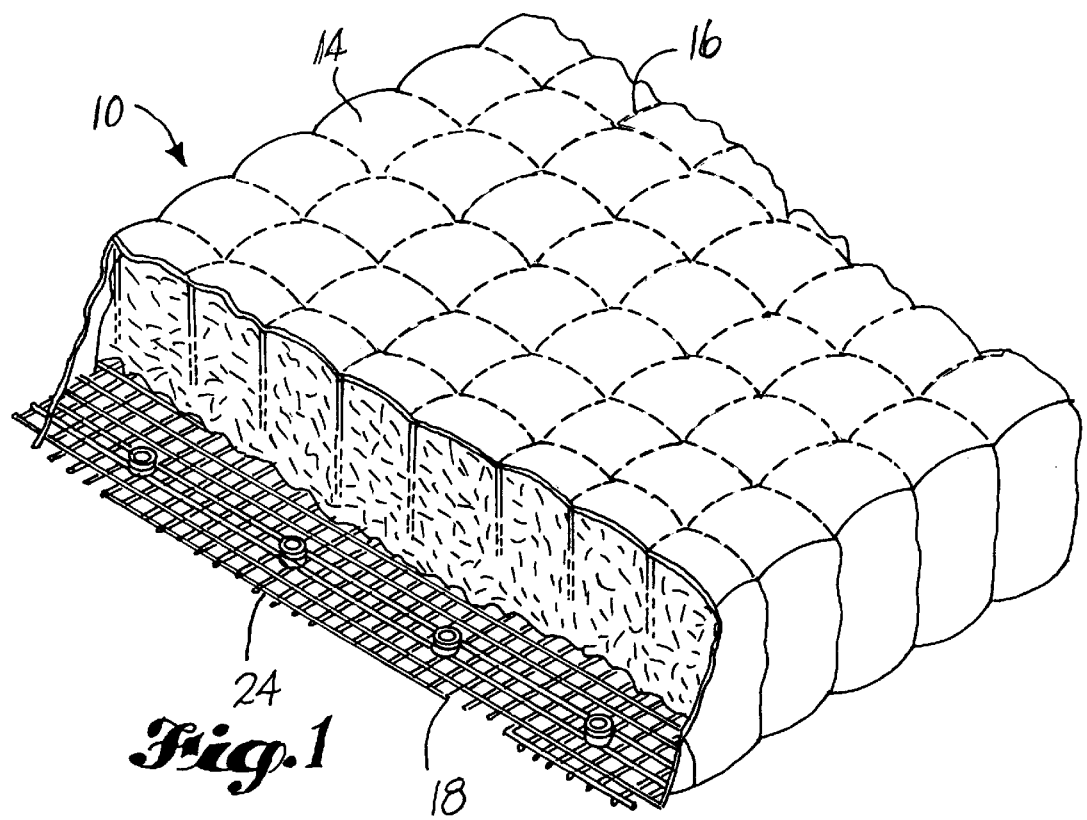
FIG. 1 is a partially cut away view of a thermal insulating blanket according to preferred embodiment of the invention showing the top of the blanket.
Figure 2:
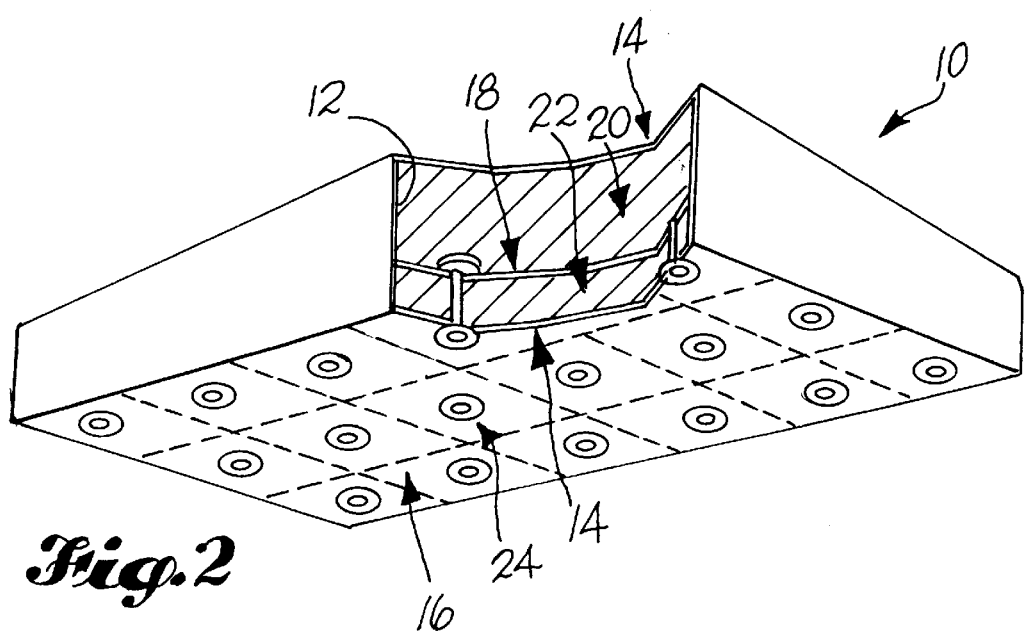
FIG. 2 is a partially cut away schematic view of the FIG. 1 embodiment showing the bottom of the blanket.
Figure 3:
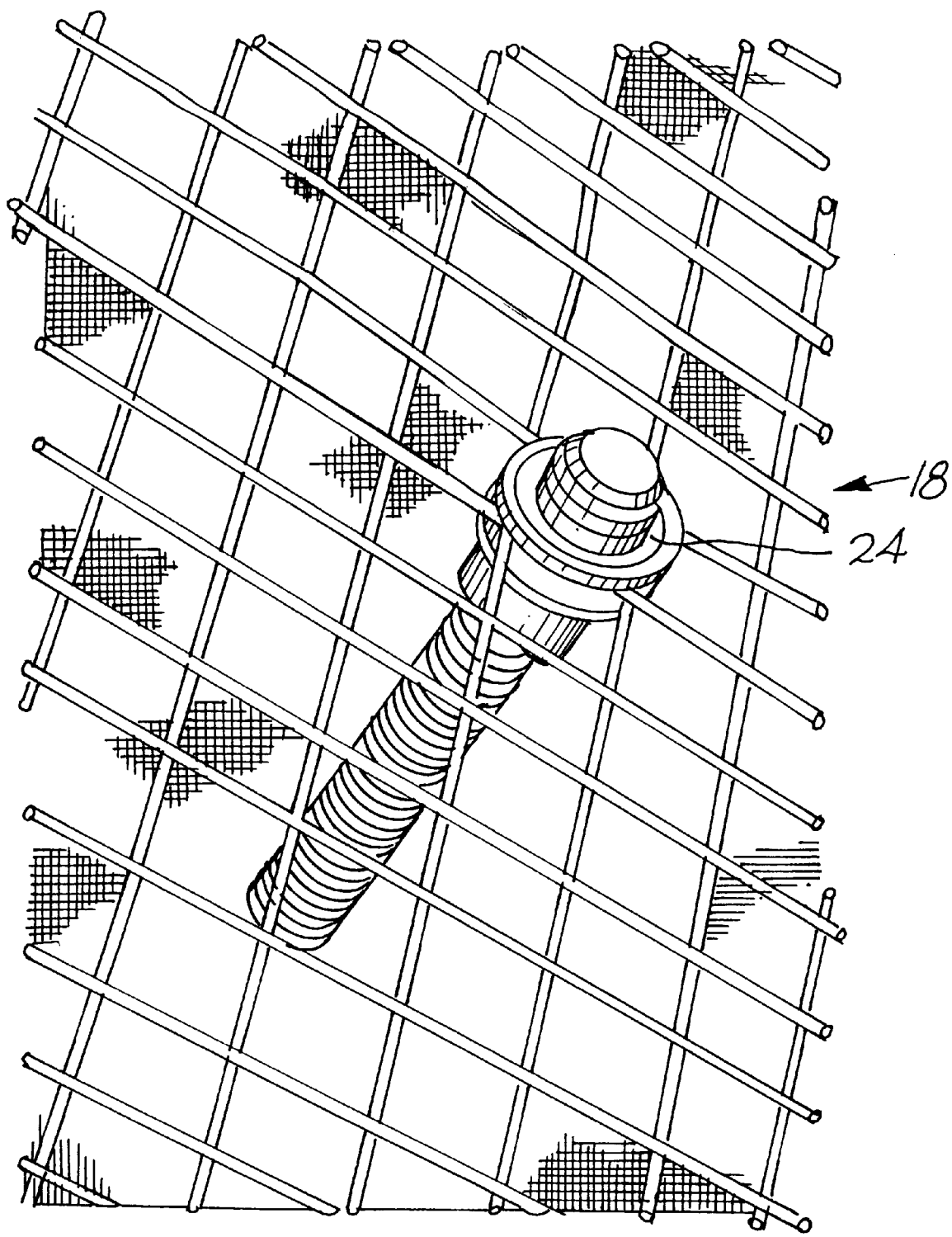
FIG. 3 is a detail of a fastener engaged with the screen of the FIG. 1 embodiment.

For purposes of illustration, a rectangular blanket about two feet by four and about an inch thick is shown, although blankets of any size or shape can be made in accordance with the invention. The illustrated embodiment is particularly suitable for launch vehicle use, although blankets constructed according to the invention can be made for any insulating application, with appropriate choice of materials. For example, blankets according to the present invention could be used in industrial applications, such as those involved with furnaces or kilns, or to insulate the interior of commercial aircraft.

Referring to the Figures, an insulating blanket 10 according to a preferred embodiment of the invention is suitable for use as advanced flexible reusable surface insulation (AFRSI) on a reusable launch vehicle. For launch vehicle use, the materials used are chosen for high heat resistance and low weight. The blanket 10 preferably is made of a low density ceramic batting 12 of a material such as silica or alumina. Such a batting is available commercially, for example the batting sold under the trade name SAFFIL by ICI. A cover 14 made of a ceramic woven material such as that sold by 3M Corporation under the trade name NEXTEL 312 or NEXTEL 440 is disposed around the batting 12. The blanket 10 is quilted or stitched together with ceramic thread 16 such as NEXTEL 440 sewing thread (also available from 3M Corporation). In the illustrated embodiment, a square quilting pattern is used.

In the preferred embodiment, a substantially rigid screen 18 is embedded within the batting 12. This can be accomplished by placing the screen 18 between a first and second batting layer 20, 22 respectively. Preferably, the layer 20 on top of the screen 18 is thicker than the layer 22 below (on the side which will be in proximity to the structure to which the blanket will be mounted in use). The bottom batting layer 22 prevents abrasive contact between the screen 18 and cover 14, and prevents undesirable heating effects and abrasion which would be present if the screen were in contact with the structure or separated therefrom only by the cover 14. For other applications, it may be acceptable for the screen 18 to lie on the surface of the batting, rather than being embedded or layered within it. For launch vehicle use, the screen material should be one which can perform in the temperature environment of spacecraft reentry, while being light weight. Titanium and stainless steel are two examples of acceptable materials. In a preferred embodiment, a coarse mesh screen of about 0.25 inch openings is acceptable.

The screen 18 is of a size and overall dimension so as to be substantially co-extensive with the blanket 10. Blankets of irregular perimeter shape can be fashioned using the present invention.

Figure 4:
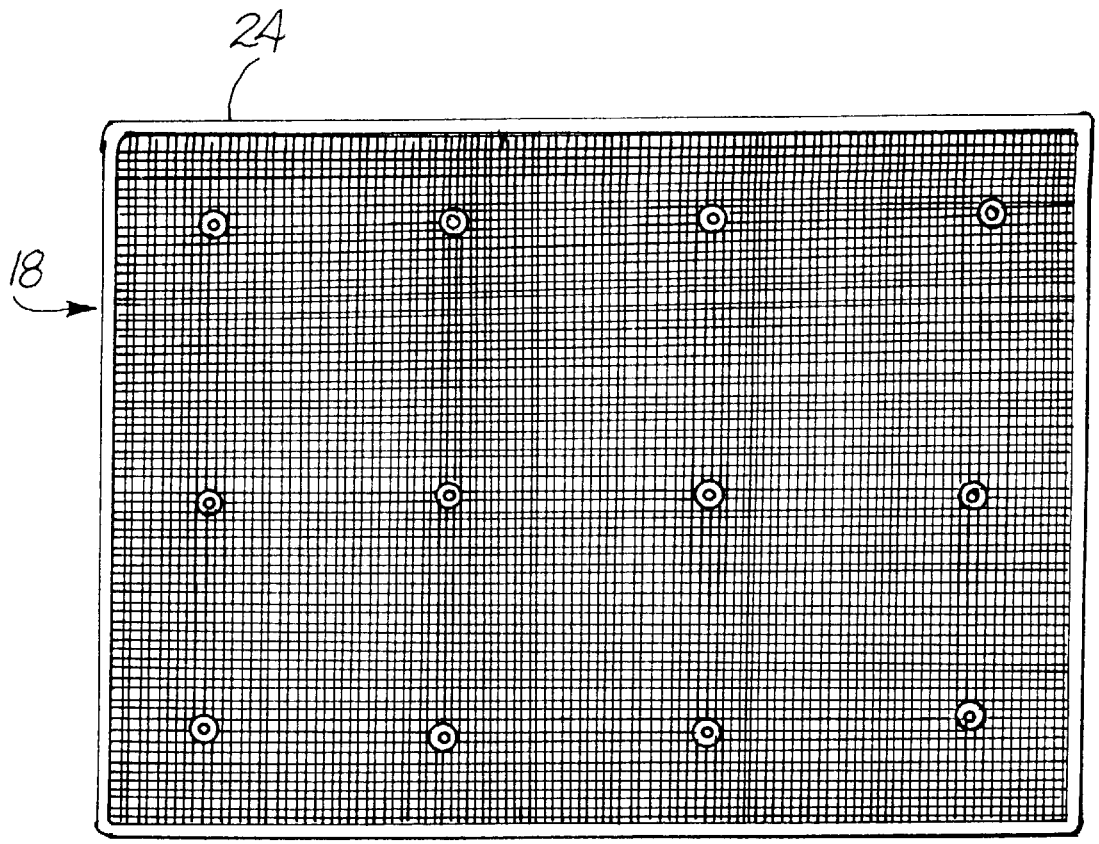
FIG. 4 is a plan view of the screen of the FIG. 1 embodiment showing the layout of the fasteners.
Figure 5:
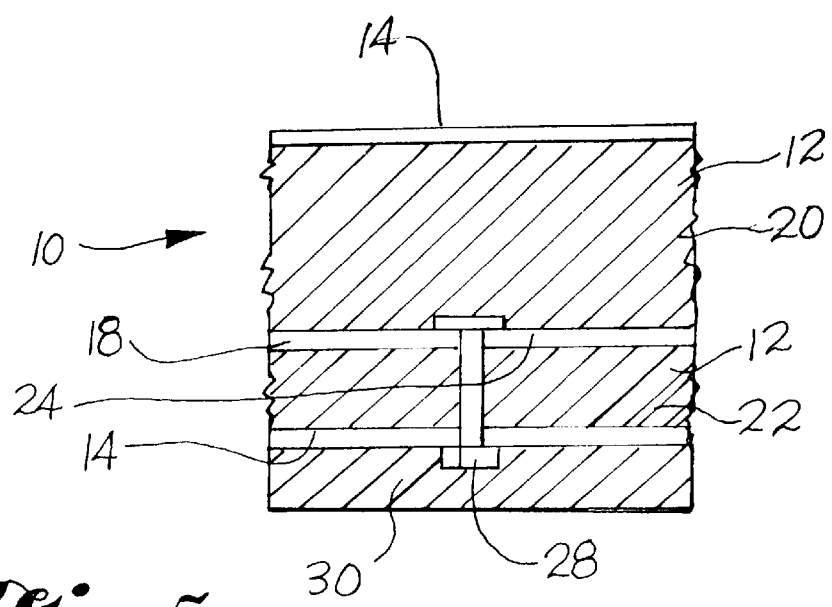
FIG. 5 is a cross sectional view of a blanket according to the FIG. 1 embodiment mounted to a structure such as a launch vehicle.

The screen 18 supports fasteners 24 which are held in a position where they extend out from the bottom of the blanket 10. Preferably, the external end of the fastener 24 is substantially flush with the blanket's surface. Preferably, the fasteners will be arranged in a rectangular array (see FIG. 4), at a spacing which is adequate for secure affixation to the structure on which the blanket is installed. The fasteners can be any of a wide variety of commercially available fasteners, although a fastener sold under the trade name RIVNUT by Rivnut Engineering Products has been found to be advantageous because it can be easily installed in the screen 18 after the cover 14 has been placed on the blanket 10, since it can be inserted through the cover fabric. Corresponding mating fasteners 28 (see FIG. 5) on the structure 30 to which the blanket will be mounted, such as the exterior surface 30 of a reusable launch vehicle, are arranged to receive the fasteners 24 extending from the blanket 10.

A blanket and structure with the mounting system of the preferred embodiment allows for quick installation and removal of the blanket, requiring little or no specialized skill.

Although the invention has been described above with respect to certain specific embodiments, the scope of the invention is not limited to the specific embodiments disclosed. Other designs within the spirit and scope of the invention will be apparent to those skilled in the field after receiving the above teachings. The scope of the invention, therefore, is defined by reference to the following claims.

What is claimed is:

1. A thermal insulation blanket comprising:

a first batting layer;

a rigid screen lying on said first batting layer;

a second batting layer lying on said screen;

a cover layer lying over said second batting layer;

means for securing said first and second batting layers in close proximity with said screen therebetween; and a plurality of fasteners held by said screen in a position where they extend out from said blanket.

2. The blanket of claim 1 wherein said first and second batting layers each comprise a ceramic batting.

3. The blanket of claim 2 wherein said cover layer comprises a ceramic woven material.

4. The blanket of claim 3 wherein said screen comprises titanium.

5. The blanket of claim 3 wherein said screen comprises stainless steel.

6. A system for mounting a thermal insulation blanket to a structure wherein said blanket comprises:

a first batting layer;

a rigid screen lying on said first batting layer;

a second batting layer lying on said screen;

a cover layer lying over said second batting layer;

means for securing said first and second batting layers in close proximity with said screen therebetween; and a plurality of fasteners held by said screen in a position where they extend out from said blanket;

and further comprising a plurality of mating fasteners arranged on said structure so as to be positioned to accept said fasteners extending from said blanket.

7. The system of claim 6 wherein said structure includes a launch vehicle.

8. The system of claim 7 wherein said first and second batting layers each comprise a ceramic batting.

9. The system of claim 8 wherein said cover layer comprises a ceramic woven material.

10. The system of claim 9 wherein said screen comprises titanium.

11. The system of claim 10 wherein said screen comprises stainless steel.

* * * * *